(12) United States Patent
Chen et al.

(10) Patent No.: US 12,094,090 B2
(45) Date of Patent: Sep. 17, 2024

(54) METHOD FOR PROCESSING IMAGE NOISE IN COMPRESSION PROCESS AND CIRCUIT SYSTEM

(71) Applicant: REALTEK SEMICONDUCTOR CORP., Hsinchu (TW)

(72) Inventors: Yan-Fong Chen, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 345 days.

(21) Appl. No.: 17/493,963

(22) Filed: Oct. 5, 2021

(65) Prior Publication Data

US 2022/0108428 A1 Apr. 7, 2022

(30) Foreign Application Priority Data

Oct. 7, 2020 (TW) .................................. 109134705

(51) Int. Cl.
*G06T 5/70* (2024.01)
*H04N 19/86* (2014.01)

(52) U.S. Cl.
CPC .............. *G06T 5/70* (2024.01); *H04N 19/86* (2014.11); *G06T 2207/20021* (2013.01)

(58) Field of Classification Search
CPC .......... G06T 2207/20021; G06T 5/002; H04N 19/86
See application file for complete search history.

(56) References Cited

U.S. PATENT DOCUMENTS 8,050,508 B2 11/2011 Peng
2001/0052942 A1* 12/2001 MacCollum ....... H04N 1/00249
348/333.01

(Continued)

FOREIGN PATENT DOCUMENTS

TW  I270298 B  1/2007
TW  I335754 B  1/2011

OTHER PUBLICATIONS

Shen-Chuan Tai, Bo-Jhih Chen, Mankit Choi. "An Efficient Method for the Detection of Ringing Artifacts and De-Ringing in JPEG Image," IEEE 2010; 28th Picture Coding Symposium; pp. 578-581.

(Continued)

*Primary Examiner* — Manuchehr Rahmjoo
(74) *Attorney, Agent, or Firm* — Li & Cai Intellectual Property (USA) Office (57) ABSTRACT

A method for processing image noise in a compression process and a circuit system thereof are provided. The circuit system receives an image that is compressed in a specific compression format, and obtains pixel values after the image is decompressed. Differences of pixel values between pixels adjacent to each other can be calculated. A specific area of the image can be divided into multiple sections. A maximum pixel value and a minimum pixel value for each area are used to obtain a regional maximum difference. The regional maximum difference is used to determine whether or not to perform an image-denoising process on the areas such as a flat area or a high-frequency area. Differences among the adjacent pixels can be adjusted according to a weighted average brightness of the adjacent pixels. The image-denoising process is performed on the areas, and an image with reduced noise is finally outputted.

12 Claims, 4 Drawing Sheets

(56) References Cited

U.S. PATENT DOCUMENTS

| | | | |
|---|---|---|---|
| 2010/0259627 A1* | 10/2010 | Trumbull | H04N 23/951 |
| | | | 348/208.4 |
| 2016/0042498 A1* | 2/2016 | Russell | G06T 5/002 |
| | | | 382/268 |
| 2020/0092509 A1* | 3/2020 | Jung | H04N 25/772 |

OTHER PUBLICATIONS

Shin-Feng Sheu. "A Study of Deblocking Filter for Video," National Cheng Kung University, Thesis for Master of Science in Electrical Engineering, Jun. 2002.

* cited by examiner

|   |   | 30 |   |   |
|---|---|---|---|---|
| 1 | 1 | 1,2 | 2 | 2 |
| 1 | 1 | 1,2 | 2 | 2 |
| 1,3 | 1,3 | X | 2,4 | 2,4 |
| 3 | 3 | 3,4 | 4 | 4 |
| 3 | 3 | 3,4 | 4 | 4 |

FIG. 3

|   |   | 40 |   |   |
|---|---|---|---|---|
| 1 | 1 | 1 | 1 | 1 |
| 1 | 1 | 2 | 1 | 1 |
| 1 | 2 | 4 | 2 | 1 |
| 1 | 1 | 2 | 1 | 1 |
| 1 | 1 | 1 | 1 | 1 |

METHOD FOR PROCESSING IMAGE NOISE IN COMPRESSION PROCESS AND CIRCUIT SYSTEM

CROSS-REFERENCE TO RELATED PATENT APPLICATION

This application claims the benefit of priority to Taiwan Patent Application No. 109134705, filed on Oct. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE PRESENT DISCLOSURE

The present disclosure is related to an image noise processing method, and more particularly to a method and a circuit system for post-processing a noise that is formed in a compression process.

BACKGROUND OF THE PRESENT DISCLOSURE

Currently, image compression techniques that are widely used (such as JPG, JPEG, MJPEG and H.26x) are essentially block-based image compression methods. For example, the Moving Picture Experts Group (MPEG) has developed MPEG-4 as a standard for audio and video compression format. MPEG-4 has the advantages of having a high compression ratio, saving memory space and providing great picture quality.

The MPEG-4 specification achieves methods of deblocking and noise deringing. The deblocking method is to filter edge pixels of image blocks for determining edges, but such a method will consume a large amount of resources for calculation. Further, it is necessary for the noise deringing method to obtain a maximum and a minimum pixel value of all the image blocks, and then determine whether or not the pixels of these blocks need to be processed by the noise deringing method according to a threshold. If needed, the pixels should be processed by a smoothing algorithm.

The common image compression techniques mentioned above are mainly the block-based image compression methods. Part of high-frequency information may be lost in a quantization step of the compression process, and therefore some noises may appear near high-frequency areas. The smoothing algorithm adopted in the conventional compression techniques may cause details of an image to blur. Further, in the method for performing filtering on edge pixels of the image for determining edges, since the edges belong to the high-frequency portion of image, calculations performed on the pixels along horizontal, vertical and 45-degree angles require a large amount of computing power and memory space (which indicates high hardware cost) to carry out a first or a second order operation upon the edges.

SUMMARY OF THE PRESENT DISCLOSURE

To improve the drawbacks that a smoothing algorithm adopted in a conventional compression technique may cause blurring of details and higher hardware cost when performing edge calculations, a method for processing image noise in a compression process and a circuit system are provided in the present disclosure. In the method, an image can be divided into a portion that is required to be processed and another portion that is not to be processed by computing and detecting content of the image according to a threshold. After that, only the portion that is required to be processed is processed with a filtering method in order to suppress the noises caused in a compression process. Therefore, the hardware cost can be reduced since the computation requirement is decreased and the blurring of details can be avoided.

In one embodiment of the present disclosure, the circuit system performing the method for processing image noise in a compression process can be an image processor installed in an electronic device, and is used for processing an image captured by a video camera of the electronic device.

In the method for processing image noise in a compression process performed by a processing circuit of the circuit system, an image that is compressed in a compression format is received, and the image is decompressed. Pixel values of pixels of the image can be obtained. Next, pixel-value differences between the adjacent pixels can be calculated, so as to obtain a maximum pixel value and a minimum pixel value for each section in an area of the image. Regional maximum differences of the areas are compared for obtaining a maximum difference of the range. The maximum difference is used as a reference to determine whether or not to perform the image-denoising process on the area.

Further, if it is determined that the range is the area where the image-denoising process needs to be performed, the image-denoising process is performed on the area; if it is determined that the range is the area where the image-denoising process needs not to be performed, the image-denoising process will not be performed. An output image with reduced noise in the compression process is finally generated.

Further, in the method for processing image noise in a compression process, an upper threshold and a lower threshold are preset for comparing with the maximum difference of the range. The image can be classified into a flat area, an ordinary texture area and a high-frequency area, or at least one of the areas. Both the flat area and the high-frequency area are the areas where the image-denoising process is required to be performed.

Still further, a weighted average brightness can be calculated based on the pixel value of each pixel of the image and pixel values of its adjacent pixels. The weighted average brightness of each of the pixels is used to calculate an average brightness of each range. A brightness adjustment curve is then introduced to obtain a brightness coefficient according to the average brightness of each range, so as to adjust the maximum difference of the range.

These and other aspects of the present disclosure will become apparent from the following description of the embodiment taken in conjunction with the following drawings and their captions, although variations and modifications therein may be affected without departing from the spirit and scope of the novel concepts of the present disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to the embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a method for processing image noise in a compression process and a circuit system. The method is used for the purpose of image compression that is performed on an input image. In the image-compression process, after calculating and detecting the content of the image, a threshold is incorporated to determine whether or not to utilize a filtering process to reduce a noise caused in the image-compression process. The image can be divided into a portion that is required to be processed and another portion not to be processed so as to reduce computation requirements.

Figure 1:
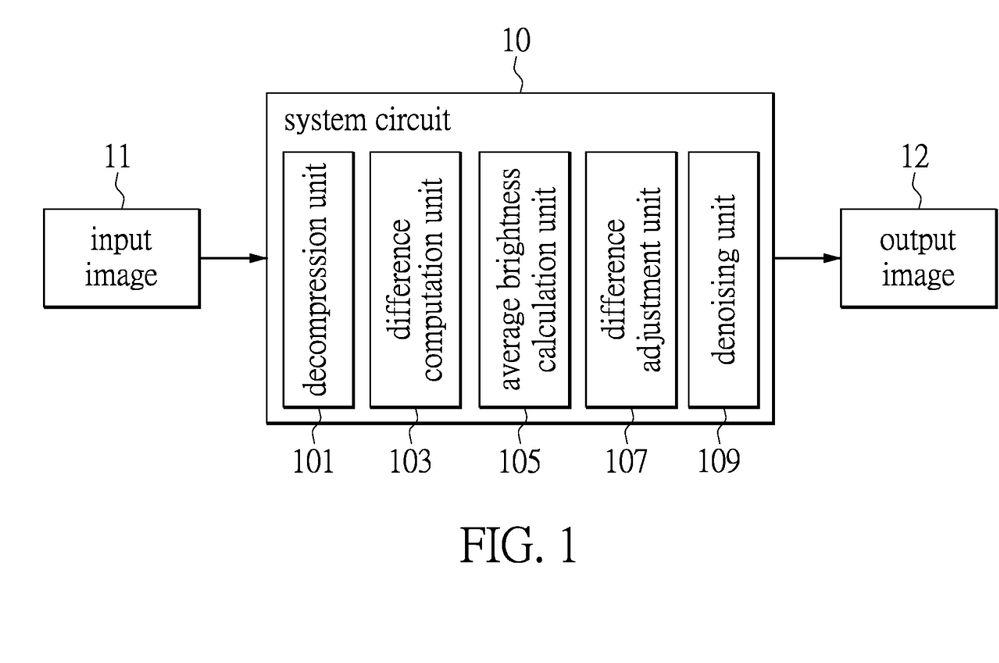
FIG. 1 is a circuit block diagram of a circuit system according to one embodiment of the present disclosure.

The circuit system that implements the method for processing image noise in a compression process is schematically shown as circuit blocks in FIG. 1. The method is applicable to any moving or still image that requires compression or decompression. In a circuit system 10, the circuit system can be an image processor of a video camera or a device installed in an electronic device, e.g., a mobile phone or a laptop computer. The circuit system includes a firmware or software (or with hardware) implemented processing circuit, such as a central processing unit (CPU) or a microprocessor. The method is performed on the image captured by the video camera. The circuit system embodies various function modules, such as a decompression unit 101, a difference computation unit 103, an average brightness calculation unit 105, a difference adjustment unit 107 and a denoising unit 109 (as shown in the diagram).

As shown in the diagram, the circuit system 10 receives an input image 11, which can be a still image or a video that is inputted frame-by-frame. The input image 11 can be compressed in a specific compression format, e.g., JPG, JPEG, MJPEG or H.26x. According to the compression format, the image inputted to the circuit system 10 is decompressed by the decompression unit 101 that is implemented by a firmware or software that operates with the processing circuit. Pixel values of pixels of the image can be obtained. Afterward, the difference computation unit 103 is used to calculate differences of pixel values among adjacent pixels. The image is then divided into multiple areas. Each of the areas is divided into multiple sections. A maximum pixel value and a minimum pixel value can be obtained in each of the sections. After that, a regional maximum difference is every area can be obtained. The regional maximum differences of the areas are then compared with each other so as to obtain a maximum difference in a specific area of the whole image. The average brightness calculation unit 105 is used to calculate a weighted average brightness based on the pixel values of the pixels around a current pixel and weights thereof. The difference adjustment unit 107 then adjusts the difference according to brightness information around the current pixel. More particularly, the difference is adjusted according to a brightness curve for highlighting a dark portion of the image, and also for adjusting a difference between a bright portion and the dark portion so as to achieve consistency.

At the end of the process, the maximum difference of every area of the image can be referred for determining whether or not to perform the image-denoising process on the area. The image-denoising process is performed on the area if it is determined that the area needs to be processed with the image-denoising process. Otherwise, the image of the area is outputted directly since the area does not need to be processed with the image-denoising process. An output image, which includes a portion that undergoes the image-denoising process in the compression process, is finally generated. In one further embodiment, an average pixel value of every section in each of the areas of the image is calculated, and a maximum difference of every area can be obtained after comparing the average pixel values of every two areas. This maximum difference is also used to determine whether or not to perform the image-denoising process.

According to one of the embodiments of the present disclosure, two thresholds can be incorporated in the method for dividing the image into several areas that has an area that requires the denoising unit 109 to reduce the noise (e.g., a kind of ringing noise) and another area that does not need to perform the image-denoising process. For the area that requires noise reduction, the image-denoising process makes a flat area more smooth and also reduces the noises in a high-frequency area. The method does not need to search directions of edges of the image since the image-denoising process does not process the edges of the image. The computation requirements can therefore be reduced. An output image 12 with reduced noise in the compression process is finally outputted.

Figure 2:
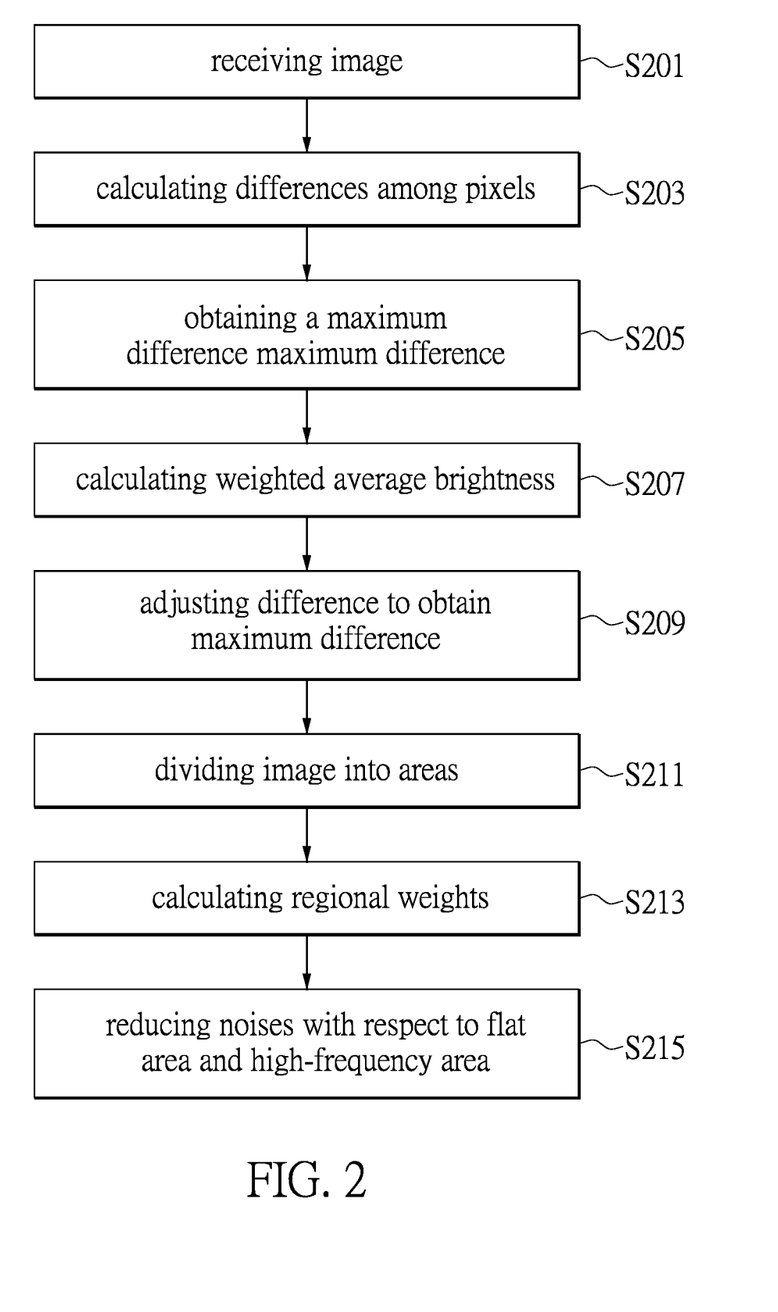
FIG. 2 shows a flow chart of a method for processing image noise in a compression process according to one embodiment of the present disclosure.

FIG. 2 shows a flow chart describing the method for processing image noise in a compression process performed in the circuit system according to one embodiment of the present disclosure.

In the process, in a beginning step S201, an input image which is compressed in a specific format is received. The image can be a still image or a video that is inputted by frames. For reducing the noises caused in the image compression process, an image-processing method performed in the circuit system is used to obtain pixel values of the pixels after the image is decompressed, such as in step S203. Differences between the current pixel and its adjacent pixels can be calculated.

Figure 3:
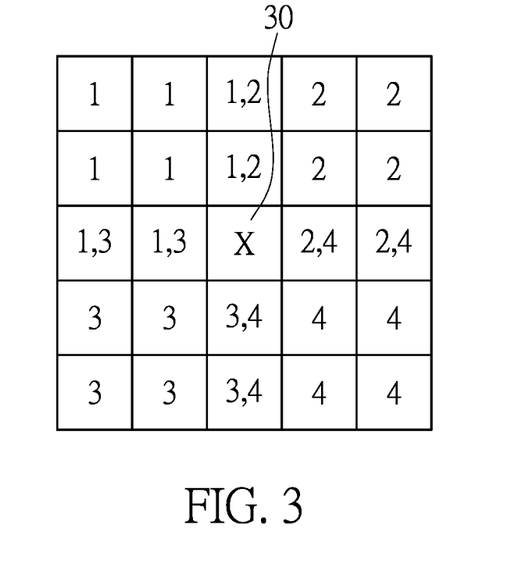
FIG. 3 is an exemplary diagram depicting a step of calculating a maximum difference within a specific range in the method for processing image noise in a compression process according to one embodiment of the present disclosure.

Reference can be made to a diagram shown in FIG. 3 for the method of calculating the differences of the pixels, in which a maximum difference within an area is calculated. This example shows a 5×5 image. A current pixel 30 is marked with 'X'. There are, but not limited to, four areas around the current pixel 30 in the example. The areas are numbered with i=1 to 4. The blocks with numbers i=1 and 2 indicate the pixels in area 1 and area 2, respectively; the blocks with numbers i=1 and 3 indicate the pixels in area 1 and area 3, respectively; the blocks with numbers i=3 and 4 indicate the pixels in area 3 and area 4, respectively; and the blocks with numbers i=2 and 4 indicate the pixels in area 2 and area 4, respectively.

In the step S203, a maximum pixel value (M) and a minimum pixel value (m) of a specific area of the whole image can be obtained. A difference between the maximum pixel value (M) and the minimum pixel value (m) is defined as a maximum difference. Therefore, a maximum pixel value M[i] and a minimum pixel value m[i] can be obtained in each of the areas (i=1, 2, 3, 4). The difference (M[i]−m[i]) is a regional maximum difference of the area (i=1, 2, 3 or 4). As shown in Equation 1 (i.e., step S205), the regional maximum differences (M[i]−m[i]) for areas in an area can be calculated to obtain a maximum difference (MD).

$$\text{Maximum Difference(MD)} = (M[i] - m[i]).$$ Equation 1:

In one aspect of the present disclosure, pixel values of edge pixels of a specific object in the image can have larger differences. Therefore, the portion with the maximum difference (MD) can be determined as an edge in the area. Instead of detecting the edges in the image, the method for processing image noise in a compression process of the present disclosure can effectively reduce an amount of computation since it neither needs to determine the edges of the image nor performs any filtering process on the edges.

When the maximum pixel value (M) and the minimum pixel value (m) are found in every area, the maximum difference of the area can be obtained by subtracting the minimum pixel value (m[i]) from the maximum pixel value (M[i]) of the areas. The maximum difference can reflect image characteristics of the image or several areas of the image. For example, a portion with the maximum difference may be the edges, and accordingly the edges in the image can be obtained without determining the directions of the edges. Further, the maximum difference can also be used to determine the flat area or the high-frequency area that requires performing the image-denoising process, and the area that does not need to perform the image-denoising process. Therefore, if the maximum differences of the multiple areas of the image are obtained, the maximum differences can be used to determine whether or not the image-denoising process is required to be performed on each of the areas according to one or more thresholds. In an exemplary example, a lower threshold and an upper threshold are incorporated in the method. The maximum difference of each of the areas is compared with these two thresholds so as to divide the areas into a flat area, an ordinary texture area or a high-frequency area.

Before performing the image-denoising process, according to one of the embodiments, the differences between the current pixel and its adjacent pixels can be adjusted according to surrounding brightness information. It should be noted that a weighted average brightness is used to adjust the differences so as to prevent details in the dark portion from being unduly omitted since many details in the dark portion (i.e., the areas with lower brightness) may be omitted in the decompression process. In an exemplary example, the dark portion of the image shows weak or insufficient light and the noises in the dark portion may not be presented easily. Thus, two differences with respect to the dark portion and the bright portion of the image should be balanced, and therefore an adjustment curve is required to adjust the differences so as to prevent the difference of the high-frequency area in the dark portion from being smaller than the difference in the bright portion. For example, the differences of the pixels in the bright portion of the image are larger than the differences of the pixels in the dark portion. The adjustment curve can be used to reduce the larger differences and increase the smaller differences. That is, the weighted average brightness can be used to solve the problem that the difference of the high-frequency area in the dark portion is smaller than the difference in the bright portion.

Figure 4:
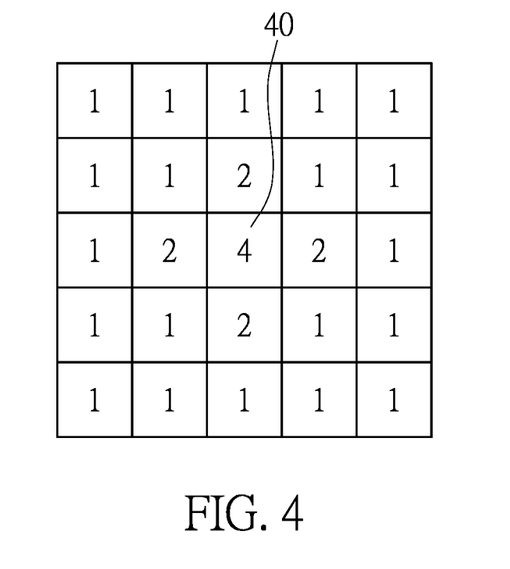
FIG. 4 is an exemplary diagram depicting weights of pixel values of pixels around a current pixel in the method according to one embodiment of the present disclosure.

In step S207, the weighted average brightness is calculated based on the pixel values of the pixels near the current pixel X. The brightness information around the current pixel is used as a reference to adjust the differences between the dark portion and the bright portion of the image. Reference is made to FIG. 4, which is a schematic diagram depicting the weights of the pixels around the current pixel.

A brightness value of a current pixel 40, which is a primary pixel, has a weight of 4. Different weights are assigned to brightness values of pixels around the current pixel 40 according to distances therebetween. The weights reflect that the pixels around the current pixel 40 have different brightness influences on the current pixel 40 based on the distances. The weights are used for calculating the weighted average brightness for each of the pixels (which becomes the current pixel and other pixels are adjacent pixels thereof). Therefore, every pixel of the image can have its own weighted average brightness that is used to adjust the difference.

Figure 5:
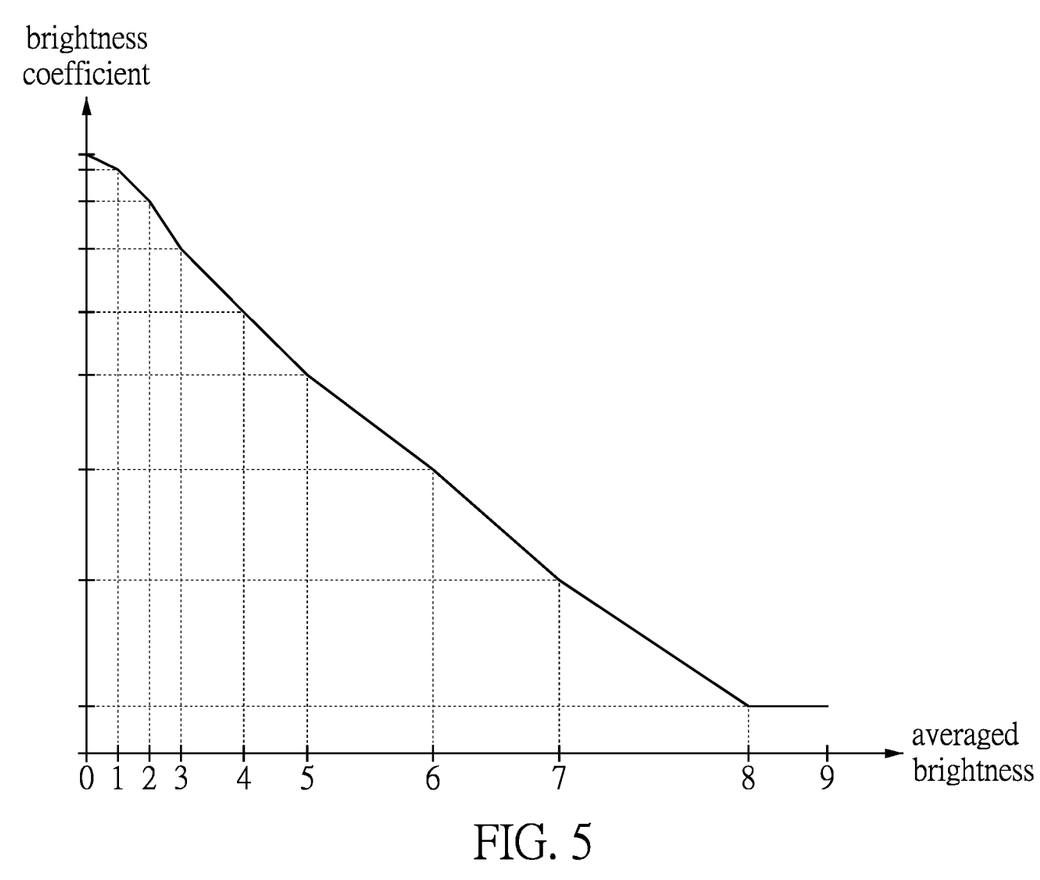
FIG. 5 is an exemplary diagram depicting a brightness adjustment curve in the method for processing image noise in a compression process according to one embodiment of the present disclosure.

In step S209, when the weighted average brightness for every pixel is obtained, an average brightness of every area of the image can be calculated. The average brightness is regarded as a reference for adjusting the difference (M[i]−m[i]) of every area and the maximum difference (MD=(M[i]−m[i]) of every area of the image. An adjusted maximum difference (MD') as shown in Equation 2 can be obtained. Reference is made to FIG. 5, which is a schematic diagram depicting an exemplary brightness adjustment curve in one embodiment of the present disclosure. According to said embodiment, the brightness adjustment curve is provided in the method that relies on the brightness information to adjust the differences between the dark portion and the bright portion of the image.

FIG. 5 shows an exemplary example of the brightness adjustment curve which is obtained through a specific algorithm such as a logarithm algorithm A horizontal axis of the diagram indicates the weighted average brightness that is calculated in step S207 of FIG. 2 in difference zones. The present example shows 8 zones, but is not limited thereto. Each zone corresponds to a brightness coefficient on a vertical axis. The brightness adjustment curve is rendered according to the characteristics of the input image. The brightness adjustment curve allows the circuit system to calculate an average brightness according to the weighted average brightness of the pixels of the image, and the brightness coefficient can be obtained since the average brightness corresponds to a specific position of the curve. If the average brightness corresponds to a middle part of the zone, an interpolation method can be used to calculate the brightness coefficient. The brightness coefficient is used to adjust the maximum difference (MD). The diagram also shows that a larger brightness coefficient can be obtained when the image/pixel has a lower average brightness. In contrast, a higher average brightness corresponds to a lower brightness coefficient. Reference can be made to Equation 2 for the adjustment to the maximum difference.

MD'=MD×brigh$_{coef}$, wherein: 0≤brigh$_{coef}$≤1.   Equation 2:

The 'MD' indicates the maximum difference obtained in Equation 1 described in step S205. The brightness adjustment curve is used to determine the brightness coefficient that minimizes the difference when the average brightness is higher and increases the difference when the average brightness is lower (which means darker). The main objective of the adjustment is to adjust the differences of the whole image to be consistent, i.e., the adjusted maximum difference (MD') obtained in Equation 2. However, according to the main embodiment of the method of the present disclosure, the steps S207 and S209 can be omitted. It should be noted that the method of the present disclosure may not use the brightness information to adjust the differences among the areas of the image.

After the differences are adjusted in the above steps, such as in step S211, several thresholds provided by the system can be used to classify a specific range in the image into several areas. Both the original maximum difference (MD) and the adjusted maximum difference (MD') obtained in step S211 can be used in the following steps.

For example, the system provides two thresholds: a lower threshold (MD_THD0) and an upper threshold (MD_THD1). All the regional maximum differences can be classified into three areas through the two thresholds, as indicated in equation 3.

{MD<MD_THD0MD_THD0≤MD≤MD_THD1MD_THD1<MD}   Equation 3:

According to Equation 3, when the maximum difference (MD) (or the adjusted maximum difference (MD')) is smaller than 'MD_THD0' (i.e., the lower threshold), it shows that the maximum difference is a relatively small value and the corresponding area belongs to the flat area. The flat area is supposed to require performing of the image-denoising process. When the maximum difference (MD) is between 'MD_THD0' (i.e., the lower threshold) and 'MD_THD1' (i.e., the upper threshold), it shows that the corresponding area has a specific texture that does not need to perform the image-denoising process. When the maximum difference (MD or MD') is larger than 'MD_THD1' (i.e., the upper threshold), it shows that the maximum difference is a relatively large image value and the corresponding area has high-frequency image features that belong to the high-frequency area and requires performing of the image-denoising process. In other words, except for the areas that do not need to perform the image-denoising process, the areas classified as the flat area or the high-frequency area need to perform the image-denoising process.

Furthermore, when the areas that require performing of the image-denoising process are obtained in step S211, weights ($W_{i,j}$) for pixels of the area can be decided based on the thresholds (i.e., EPF_THD0, EPF_THD1) provided by the system. The concept of the weights ($W_{i,j}$) is to enhance the process performed on the area according to the characteristics between the current pixel and the adjacent pixels. For example, a smaller weight or zero weight is assigned to the area with a larger difference, and a larger weight or even a maximum weight is assigned to the area with a smaller difference. Therefore, the process allows the flat area to be flatter and effectively reduces the noises in the high-frequency area, such as in step S213.

Further, the differences ($D_{i,j}$) between every pixel and its adjacent pixels can be compared with the two thresholds (i.e., EPF_THD1, EPF_THD0). The weights ($W_{i,j}$) assigned to pixels surrounding the current pixel in the area that requires performing of the image-denoising process can be decided in Equation 4. In Equation 4, the maximum weight ($W_{i,j}$=maxW) is assigned to the pixels adjacent to the current pixel when the differences are very small (i.e., $D_{i,j}$<EPF_THD0); the weight ((($D_{i,j}$−EPF_THD0)×maxW)/(EPF_THD1−EPF_THD0)) is assigned to the pixels adjacent to the current pixel when the differences are relatively large but not very large; weight 0 ($W_{i,j}$=0) is assigned to the pixels when the differences between the current pixel and its adjacent pixels are very large (i.e., $D_{i,j}$>EPF_THD1).

$$W_{i,j} = \begin{cases} \max W, \text{if } D_{i,j} \\ < \text{EPF\_THD0} \frac{(D_{i,j} - \text{EPF\_THD0}) \times \max W}{\text{EPF\_THD1} - \text{EPF\_THD0}}, \\ \text{if EPF\_THD0} \leq D_{i,j} \\ \leq \text{EPF\_THD10, if } D_{i,j} > \text{EPF\_THD1}. \end{cases}$$   Equation 4

Afterward, as shown in step S215, the image-denoising process is performed on the pixel values ($P_{x,y}$) of the pixels based on the weights ($W_{i,j}$) with respect to the pixels. The image-denoising process is particularly performed on the pixels in the flat area and the high-frequency area that require image-denoising process, as expressed in Equation 5.

$$P'_{x,y} = \frac{\sum_{i,j}(P_{x+i,y+j} \times W_{i,j}) + P_{x,y} \times \left(totalW - \sum_{i,j} W_{i,j}\right)}{tatolW}$$   Equation 5 wherein, '$\Sigma_{i,j} P_{x+i,y+j} \times W_{i,j}$' indicates that every pixel value ($P_{x+i,y+j}$) adjacent to the current pixel value ($P_{x,y}$) is multiplied by a corresponding weight ($W_{i,j}$); '$P_{x,y} \times$(totalW−$\Sigma_{i,j} W_{i,j}$)' indicates that the current pixel value ($P_{x,y}$) is multiplied by a difference that a total weight (totalW) subtracts a summation ($\Sigma_{i,j} W_{i,j}$) of all weights of the pixels for insufficient compensation; a result of the multiplication is divided by a total weight for obtaining the pixel value ($P'_{x,y}$) with reduced noise.

It is worth noting that, in the method for processing image noise in a compression process of the present disclosure, the differences of the pixel values among the pixels of the image represent the characteristics of the image, and accordingly the flat area and the high-frequency area can be determined. A weighted average brightness can be calculated in the area. The difference can therefore be adjusted based on the brightness. One of the objectives of the adjustment is to even the differences of the areas in the image, so that the differences of the whole image have a unified difference standard. In particular, the edges of the image may not be processed in the image-denoising process, and the computation can be reduced since the directions of the edges of the image do not need to be determined. Further, in the method that performs the image-denoising process on the pixels in the areas that require processing, the details of the image can be kept since they do not need to be processed, and the noises in the bright portion of the image can be effectively processed. For example, a mosquito noise or a ringing noise that is generated by a conventional image compression technique can also be solved by the method.

In conclusion, according to the above embodiments related to the method for processing image noise in a compression process and the circuit system thereof, the circuit system can be an image processing circuit installed in an electronic device having a video camera. The method is adapted to reduce the noise in an image compression process and determine characteristics of the image according to the differences among areas of the image. Some thresholds are used to determine the portions that need to be processed or not, and only the portions that need to be processed require performing of the image-denoising process. Therefore, the method can effectively reduce computation and save hardware cost.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing image noise in a compression process, performed in an image processor of a video camera, comprising:
   receiving an image compressed in a compression format;
   decompressing the image for obtaining pixel values of pixels of the image;
   calculating pixel-value differences between adjacent ones of the pixels, wherein one of a plurality of areas of the image is divided into multiple sections, a maximum pixel value and a minimum pixel value for each of the sections are obtained, and a regional maximum difference of the section is also obtained; wherein a maximum difference of the area is obtained by comparing the regional maximum differences;
   comparing the maximum difference of the area with a lower threshold and an upper threshold for dividing the image into at least one of a flat area, an ordinary texture area or a high-frequency area; and
   performing an image-denoising process on the flat area and the high-frequency area, but not on the ordinary texture area, such that an output image with reduced noise in the compression process is then rendered.

2. The method according to claim 1, wherein, when the areas that require performing the image-denoising process are obtained, a difference ($D_{i,j}$) between a pixel value of each of the pixels and pixel values of the pixels that are adjacent thereto in the areas are compared with two thresholds (EPF_THD0,EPF_THD1) so as to decide a weight ($W_{i,j}$) of each of the pixels, and the weight of each of the pixels is obtained through an equation as follows:

$$W_{i,j} = \begin{cases} \max W, & \text{if } D_{i,j} < \text{EPF\_THD0} \\ \frac{(D_{ij} - \text{EPF\_THD0}) \times \max W}{\text{EPF\_THD1} - \text{EPF\_THD0}}, & \text{if } \text{EPF\_THD0} \leq D_{i,j} \leq \text{EPF\_THD1} \\ 0, & \text{if } D_{i,j} > \text{EPF\_THD1} \end{cases}$$

3. The method according to claim 1, wherein, a weighted average brightness is calculated based on a pixel value of each pixel of the image and pixel values of the pixels that are adjacent thereto, and the weighted average brightness of the pixel is used to calculate an average brightness of each area, so as to adjust the maximum difference of the area.

4. The method according to claim 3, wherein, a brightness adjustment curve is introduced for obtaining a brightness coefficient according to the average brightness of each area, and the brightness coefficient is used to adjust the maximum difference of the area.

5. The method according to claim 4, wherein, when the areas that require performing the image-denoising process are obtained, a difference ($D_{i,j}$) between a pixel value of each of the pixels and pixel values of the pixels that are adjacent thereto in the areas are compared with two thresholds (EPF_THD0,EPF_THD1) so as to decide a weight ($W_{i,j}$) of each of the pixels, and the weight of each of the pixels is obtained through an equation as follows:

$$W_{i,j} = \begin{cases} \max W, & \text{if } D_{i,j} < \text{EPF\_THD0} \\ \frac{(D_{ij} - \text{EPF\_THD0}) \times \max W}{\text{EPF\_THD1} - \text{EPF\_THD0}}, & \text{if } \text{EPF\_THD0} \leq D_{i,j} \leq \text{EPF\_THD1} \\ 0, & \text{if } D_{i,j} > \text{EPF\_THD1} \end{cases}$$

6. The method according to claim 5, wherein, wherein the image-denoising process is performed on the pixel value of each of the pixels according to a weight ($W_{i,j}$) of the pixel, and an equation for obtaining a pixel value ($P'_{x,y}$) with reduced noise is as follows:

$$P'_{x,y} = \frac{\sum_{i,j}(P_{x+i,y+j} \times W_{i,j}) + P_{x,y} \times \left(totalW - \sum_{i,j} W_{i,j}\right)}{tatolW}$$

wherein, '$\sum_{i,j}(P_{x+i,y+j} \times W_{i,j})$' indicates that each pixel value ($P_{x+i,y+j}$) adjacent to a current pixel value ($P_{x,y}$) is multiplied by a corresponding weight ($W_{i,j}$); '$P_{x,y} \times (totalW - \sum_{i,j} W_{i,j})$' indicates that the current pixel value ($P_{x,y}$) is multiplied by a difference obtained from subtracting a total weight (totalW) and a summation ($\sum_{i,j} W_{i,j}$) of all weights of the pixels for insufficiency compensation; a result of the multiplication is divided by a total weight for obtaining the pixel value ($P'_{x,y}$) with reduced noise.

7. A circuit system, which is an image processor of a video camera for processing an image captured by the video camera, comprising:
a processing circuit, performing a method for processing image noise in a compression process, wherein the method includes:
receiving the image compressed in a compression format;
decompressing the image for obtaining pixel values of pixels of the image;
calculating pixel-value differences between adjacent ones of the pixels, wherein one of a plurality of areas of the image is divided into multiple sections, a maximum pixel value and a minimum pixel value for each of the sections are obtained, and a regional maximum difference of the section is also obtained; wherein a maximum difference of the area is obtained by comparing the regional maximum differences;
comparing the maximum difference of the area with a lower threshold and an upper threshold for dividing the image into at least one of a flat area, an ordinary texture area or a high-frequency area; and
performing an image-denoising process on the flat area and the high-frequency area, but not on the ordinary texture area, such that an output image with reduced noise in the compression process is then rendered.

8. The circuit system according to claim 7, wherein, when the areas that require performing the image-denoising process are obtained, a difference ($D_{i,j}$) between a pixel value of each of the pixels and pixel values of the pixels that are adjacent thereto in the areas are compared with two thresholds (EPF_THD0, EPF_THD1) so as to decide a weight ($W_{i,j}$) of each of the pixels, and the weight of each of the pixels is obtained through an equation as follows:

$$W_{i,j} = \begin{cases} \text{max}W, & \text{if } D_{i,j} < \text{EPF\_THD0} \\ \frac{(D_{ij} - \text{EPF\_THD0}) \times \text{max}W}{\text{EPF\_THD1} - \text{EPF\_THD0}}, & \text{if } \text{EPF\_THD0} \leq D_{i,j} \leq \text{EPF\_THD1} \\ 0, & \text{if } D_{i,j} > \text{EPF\_THD1} \end{cases}$$

9. The circuit system according to claim 7, wherein, in the method for processing image noise in a compression process performed by the processing circuit, a weighted average brightness is calculated based on pixel value of each pixel of the image and pixel values of its adjacent pixels, and the weighted average brightness of the pixel is used to calculate an average brightness of every area so as to adjust the maximum difference of the area.

10. The circuit system according to claim 9, wherein, a brightness adjustment curve is introduced for obtaining a brightness coefficient according to the average brightness of each area, and the brightness coefficient is used to adjust maximum difference of the area.

11. The circuit system according to claim 10, wherein, when the areas that require performing the image-denoising process are obtained, a difference ($D_{i,j}$) between a pixel value of each of the pixels and pixel values of the pixels that are adjacent thereto in the areas are compared with two thresholds (EPF_THD0, EPF_THD1) so as to decide a weight ($W_{i,j}$) of each of the pixels, and the weight of each of the pixels is obtained through an equation as follows:

$$W_{i,j} = \begin{cases} \text{max}W, & \text{if } D_{i,j} < \text{EPF\_THD0} \\ \frac{(D_{ij} - \text{EPF\_THD0}) \times \text{max}W}{\text{EPF\_THD1} - \text{EPF\_THD0}}, & \text{if } \text{EPF\_THD0} \leq D_{i,j} \leq \text{EPF\_THD1} \\ 0, & \text{if } D_{i,j} > \text{EPF\_THD1} \end{cases}$$

12. The circuit system according to claim 11, wherein the image-denoising process is performed on pixel value of each of the pixels according to a weight ($W_{i,j}$) of the pixel, and the equation for obtaining the pixel value ($P'_{x,y}$) with reduced noise is as follows:

$$P'_{x,y} = \frac{\sum_{i,j}(P_{x+i,y+j} \times W_{i,j}) + P_{x,y} \times \left(totalW - \sum_{i,j} W_{i,j}\right)}{tatolW}$$

wherein, '$\sum_{i,j}(P_{x+i,y+j} \times W_{i,j})$' indicates that every pixel value ($P_{x+i,y+j}$) adjacent to the current pixel value ($P_{x,y}$) is multiplied by a corresponding weight ($W_{i,j}$); '$P_{x,y} \times (totalW - \sum_{i,j} W_{i,j})$' indicates that the current pixel value ($P_{x,y}$) is multiplied by a difference that a total weight (totalW) subtracts a summation ($\sum_{i,j} W_{i,j}$) of all weights of the pixels for insufficiency compensation; a result of the multiplication is divided by a total weight for obtaining the pixel value ($P'_{x,y}$) with reduced noise.

* * * * *